United States Patent
Ho

(10) Patent No.: US 8,238,341 B2
(45) Date of Patent: Aug. 7, 2012

(54) APPARATUS AND METHOD FOR PROCESSING VOICE OVER INTERNET PROTOCOL PACKETS

(75) Inventor: Min-Ching Ho, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 1139 days.

(21) Appl. No.: 12/109,365

(22) Filed: Apr. 25, 2008

(65) Prior Publication Data
US 2009/0268714 A1    Oct. 29, 2009

(51) Int. Cl.
*H04L 12/56* (2006.01)

(52) U.S. Cl. ........................................ 370/394

(58) Field of Classification Search .................. None
See application file for complete search history.

(56) References Cited

U.S. PATENT DOCUMENTS

| | | | |
|---|---|---|---|
| 5,414,696 A * | 5/1995 | Tsuzuki et al. | 370/219 |
| 5,596,581 A * | 1/1997 | Saeijs et al. | 370/394 |
| 5,914,954 A * | 6/1999 | Nakayama | 370/394 |
| 6,507,584 B1 * | 1/2003 | Moriwaki et al. | 370/398 |
| 7,359,324 B1 | 4/2008 | Ouellette et al. | |
| 2002/0057712 A1* | 5/2002 | Moriwaki et al. | 370/463 |
| 2003/0219038 A1* | 11/2003 | Saeijs et al. | 370/503 |
| 2006/0146780 A1* | 7/2006 | Paves | 370/348 |
| 2006/0203807 A1* | 9/2006 | Kouretas et al. | 370/352 |

\* cited by examiner

*Primary Examiner* — Gregory Sefcheck
*Assistant Examiner* — Joshua Smith
(74) *Attorney, Agent, or Firm* — Altis Law Group, Inc.

(57) ABSTRACT

A method for processing Voice over Internet Protocol (VoIP) packets is provided. The method includes: determining if the arrived VoIP packet arrives out of order according to a sequence number of the arrived VoIP packet and a sequence number of a preceding VoIP packet of the arrived VoIP packet; determining whether the buffer has a packet having a same sequence number as the arrived VoIP packet if the arrived VoIP packet arrives out of order; calculating the difference between the sequence number of the arrived VoIP packet and that of the preceding VoIP packet if the buffer has no such packet having the same sequence number as the arrived VoIP packet; and counting a number of pseudo packets needed to be inserted into the buffer according to the calculated difference and generating and inserting the number of pseudo packets into the buffer.

13 Claims, 5 Drawing Sheets

APPARATUS AND METHOD FOR PROCESSING VOICE OVER INTERNET PROTOCOL PACKETS

BACKGROUND

1. Field of the Invention

The present invention relates to apparatuses and methods for processing data packets, and particularly to an apparatus and a method for processing Voice over Internet Protocol (VoIP) packets.

2. Description of Related Art

VoIP is a technology that allows transmission of real-time audio using an Internet Protocol (IP) network, such as the Internet. To transmit real-time audio over the IP network, audio signals are stored in a payload of one or more data packets. Such data packets are generally referred to as "VoIP packets". Unlike a telephone network in which there is a dedicated connection and path between a source and a destination, each VoIP packet may travel on a different path from the source to the destination in the IP network, and some VoIP packets may travel faster than others. Thus, the VoIP packets transmitted over the IP network may be received out of order. To compensate for these path differences, a jitter buffer is located at the receiver for storing received VoIP packets and forwarding the audio signals stored in the payload of the VoIP packets to a listener at the rate the VoIP packets were received in the jitter buffer.

One standard protocol for packetizing the real-time audio signals for transmission over the IP network is the Real-Time Transport Protocol (RTP) (Request for Comments "RFC" 3550, July. 2003) at http://www.ietf.org/rfc/rfc3550.txt. However, the RTP only provides information for error handling, without providing functions for error handling. Thus, once network congestion occurs, the VoIP packet(s) may be lost or delayed, and the quality of the audio signals may be seriously downgraded.

Accordingly, an apparatus and method for processing VoIP packets are desired in order to overcome the above-described problems.

SUMMARY

In one aspect, a method for processing Voice over Internet Protocol (VoIP) packets at an electronic apparatus is provided. The method includes the following steps: sending an VoIP packet to a buffer in the electronic apparatus; determining if the arrived VoIP packet arrives out of order according to a sequence number of the arrived VoIP packet and a sequence number of a preceding VoIP packet of the arrived VoIP packet; determining whether the buffer has a packet having a same sequence number as the sequence number of the arrived VoIP packet, if the arrived VoIP packet arrives out of order; calculating the difference between the sequence number of the arrived VoIP packet and the sequence number of the preceding VoIP packet if the buffer has no packet having the same sequence number as the arrived VoIP packet; counting a number of pseudo packets needed to be inserted into the buffer according to the calculated difference and generating the number of pseudo packets; and inserting the number of pseudo packets and the arrived VoIP packet into the buffer.

Other advantages and novel features of the present data packet processing method and apparatus will become more apparent from the following detailed description of preferred embodiments when taken in conjunction with the accompanying drawings.

DETAILED DESCRIPTION OF THE EMBODIMENTS

Figure 1:
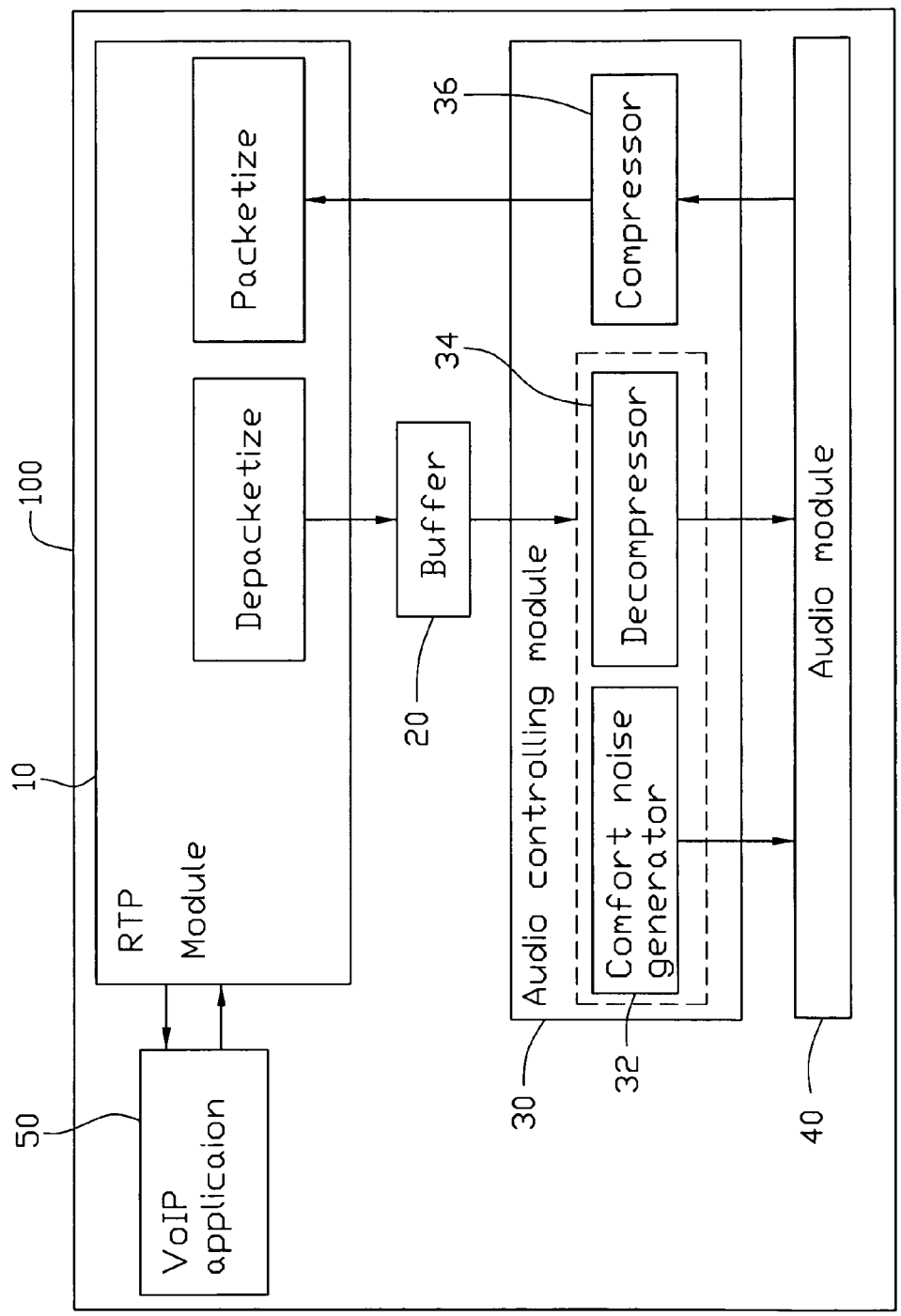
FIG. 1 is a functional block diagram of an apparatus for processing VoIP packets in accordance with an exemplary embodiment.

FIG. 1 is a functional block diagram of an apparatus for processing VoIP packets (hereinafter, "the apparatus") in accordance with an exemplary embodiment. The apparatus 100 may be installed in various kinds of electronic apparatuses (i.e., a computer), and especially in portable electronic devices, such as mobile phones, notebooks, and personal digital assistants (PDAs), and so on. The apparatus 100 provides an interface (not shown) to communicate with user applications.

In the exemplary embodiment, the apparatus 100 is installed in a mobile phone (not shown in FIG. 1). For example, while a user engages in a VoIP session through the mobile phone with another communication apparatus, a VoIP application stored in the mobile phone exchanges VoIP packets with the RTP module 10. During the VoIP session, the VoIP packets are transmitted over an uplink channel, i.e., from the user to the communication apparatus, or over a downlink channel, i.e., from the communication apparatus to the user.

The apparatus 100 typically includes an RTP module 10, a buffer 20, an audio controlling module (ACM) 30, and an audio module (AM) 40, and a VoIP application 50. The apparatus 100 has two functions: transmitting and receiving. During different functions of the apparatus 100, the above described modules implement different procedures.

When the apparatus 100 functions as a transmitter, the audio module 40 is configured for generating raw data according to voice of the user, and then outputting the raw data to the audio controlling module 30. The audio controlling module 30 is configured for compressing the raw data, and generating compressed raw data. The RTP module 10 is configured for packetizing the compressed raw data to generate a plurality of VoIP packets, and then transmitting the plurality of VoIP packets to the VoIP application 50 in the mobile phone. The VoIP application 50 transmits the VoIP packets to other communication apparatuses (i.e., another mobile phone) via a downlink. Each of the VoIP packets includes RTP information, i.e., an RTP timestamp and a sequence number.

When the apparatus 100 functions as a receiver, the RTP module 10 is configured for receiving a plurality of VoIP packets from another communication apparatus, and then depacketizing the VoIP packets, i.e., removing headers of the VoIP packets. The VoIP packets are input to the buffer 20 after being depacketized.

During transmission, the VoIP packets relating to the VoIP session may arrive at the mobile phone out of order, because of being delayed or lost, when a large amount of traffic is present on the network. The buffer 20 is configured for reordering the VoIP packets by generating pseudo packets (described in detail in relation to FIG. 2), and handling VoIP packet loss (described in detail in relation to FIG. 3). The audio controlling module 30 is also configured for decompressing the VoIP packets into raw data, and generating comfort noise upon receiving the pseudo packets. The raw data and the comfort noise are output to the audio module 40 and then be played by the audio module 40.

Figure 2:
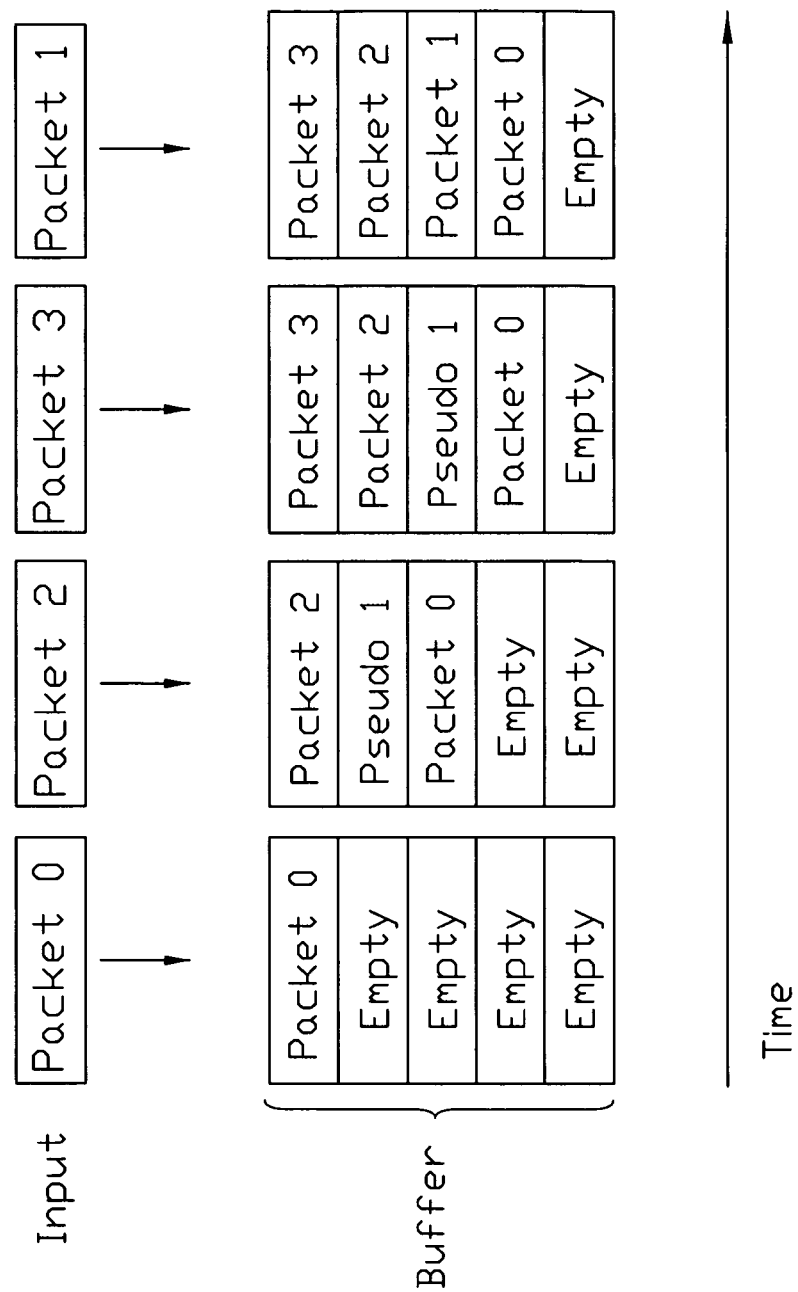
FIG. 2 is a schematic diagram illustrating a packets reordering process in accordance with the exemplary embodiment.

The buffer 20 may be a jitter buffer, and a dimension of the buffer 20 may be dynamically adjusted. In the exemplary embodiment, the buffer 20 includes a plurality of areas for buffering the VoIP packets successively output from the RTP module 10. Referring to FIG. 2, if one of the VoIP packets is output (hereinafter referred to as "the arrived VoIP packet") to the buffer 20, the buffer 20 determines whether the buffer 20 is empty. If yes, the arrived VoIP packet is directly inserted into the buffer 20. For example, "packet 0" is inserted into the buffer 20 as shown in FIG. 2. Otherwise, if the buffer 20 is not empty, the buffer 20 determines whether the sequence number of the arrived VoIP packet and a sequence number of a VoIP packet previously inserted into the buffer 20 (hereinafter referred to as "the preceding VoIP packet") are consecutive. For instance, the buffer 20 determines whether the sequence number of "packet 3" (the arrived VoIP packet) and the sequence number of "packet 2" (the preceding VoIP packet of "packet 3") are consecutive. For illustration, all types of packets in the buffer 20 are called by a joint name "the buffered packet(s)," in the embodiment, the buffered packets include the VoIP packets and the pseudo packets. Each of the buffered packets has a unique sequence number.

If the two sequence numbers are consecutive, the buffer 20 inserts the arrived VoIP packet into the buffer 20. If the two sequence numbers are non-consecutive, the buffer 20 is configured for confirming that arrival of the arrived VoIP packet and the preceding VoIP packet are out of order, and further determining if a buffered packet has the same sequence number as the arrived VoIP packet. If the buffer 20 does not have such a buffered packet, either VoIP or pseudo, the buffer 20 calculates a difference between the sequence numbers of the arrived VoIP packet and the preceding VoIP packet, generates a number of pseudo packets according to the difference, and inserts the number of pseudo packets and the arrived VoIP packet into the buffer 20 in sequence. Specifically, the number of the pseudo packets is equal to the difference of the sequence numbers minus one.

If the buffer 20 has a buffered packet having the same sequence number as the arrived VoIP packet, the buffer 20 determines whether the buffered packet is a pseudo packet. If yes, the buffer 20 replaces the pseudo packet having the same sequence number as the arrived VoIP packet with the arrived VoIP packet. If the buffered packet is not a pseudo packet but is actually a VoIP packet, then the buffer 20 determines that the arrived VoIP packet is a duplicate of the buffered VoIP packet. That is to say, the arrived VoIP packet was retransmitted due to a network error. In this case, the arrived VoIP packet is directly dropped by the buffer 20.

An example of reordering VoIP packets by the buffer 20 is shown in FIG. 2. The VoIP packets arrived out of order, i.e., "packet 0", "packet 2", "packet 3", "packet 1." Firstly, "packet 0" is inserted into the buffer 20 directly as the buffer 20 is empty, and then "packet 2" arrives. Upon determining that the sequence numbers of "packet 2" and "packet 0" are inconsecutive, the buffer 20 calculates the difference between the sequence numbers of 'packet 0" and "packet 2" for determining a number of pseudo packets needed to be inserted. The number of the pseudo packets needed to be inserted equals the difference of the sequence numbers minus one. In this case, the difference is two and thus one pseudo packet has to be inserted into the buffer 20. As shown in FIG. 2, "pseudo 1" is inserted into the buffer 20, and then "packet 2" is inserted thereafter. Upon the arrival of "packet 1," the buffer 20 determines that "packet 1" has a corresponding buffered packet having the same sequence number in the buffer 20, and the buffered packet is a pseudo packet, i.e., "pseudo 1." Therefore, "pseudo 1" in the buffer 20 is then replaced by the "packet 1." In this way, the VoIP packets are reordered in the buffer 20. The VoIP packets stored in the buffer 20 are then successively output to the audio controlling module 30.

Figure 3:
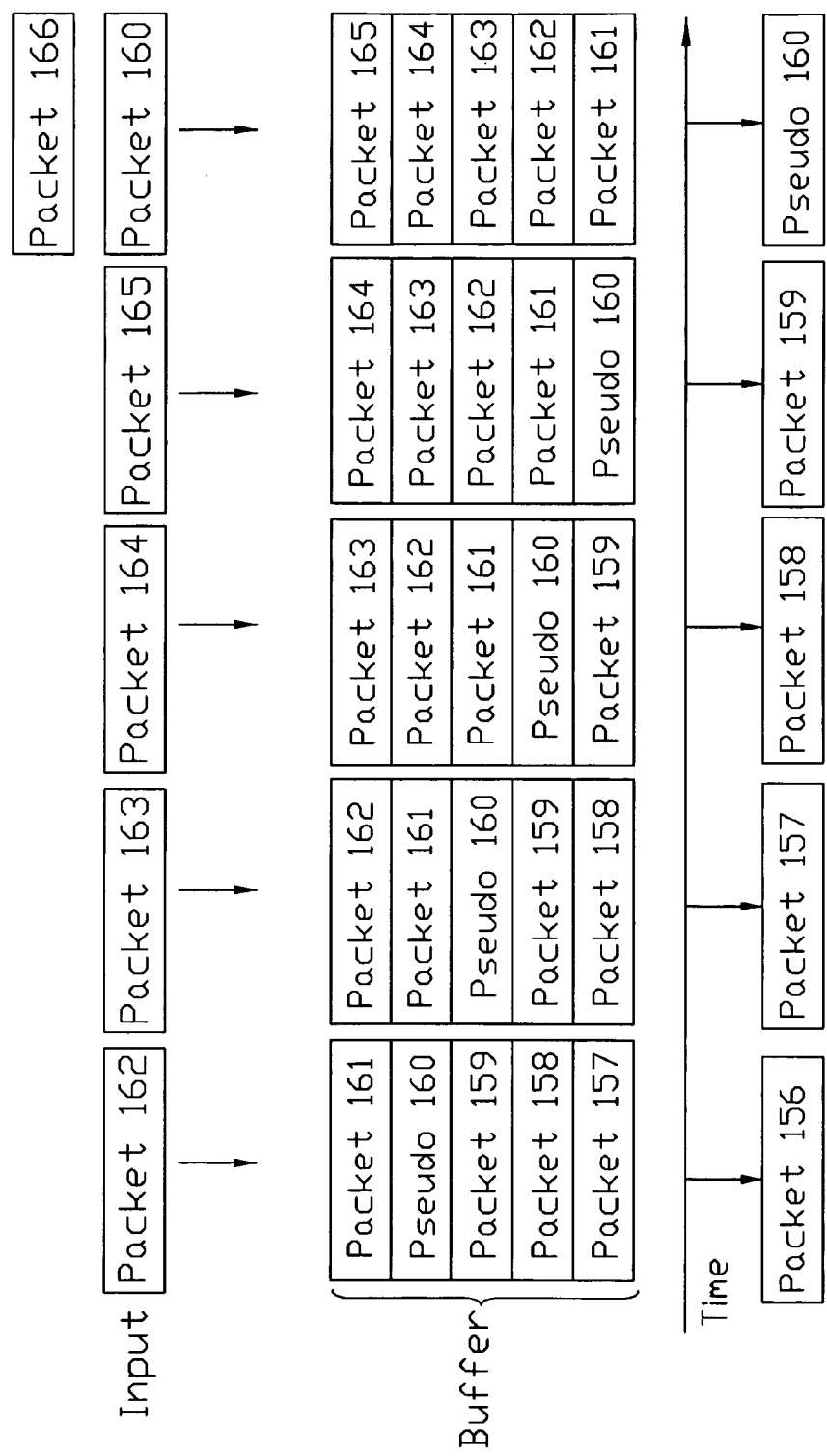
FIG. 3 is a schematic diagram illustrating a packets loss handling process in accordance with the exemplary embodiment.

FIG. 3 shows an example of loss handling performed by the buffer 20. Referring to FIG. 3, "packets 156" through "packets 166", except "packet 160," arrive at the buffer 20 in order. In this case, "pseudo 160" is inserted into the buffer 20 after "packet 159." In the process of handling VoIP packets loss, the buffer 20 determines whether the arrived VoIP packet is late according to the RTP information, i.e., timestamp and sequence number, of the arrived VoIP packet and the dimension of the buffer 20, and drops the arrived VoIP packet if the VoIP packet is late.

If the sequence number of the arrived VoIP packet is less than the sequence number of a buffered packet which is ready to be output from the buffer 20 (hereinafter referred to as "the departed packet"), the arrived VoIP packet is determined to be late. For instance, when "packet 160" (the arrived VoIP packet) arrives, "packet 161" (the departed packet) is to be output at this time. The sequence number of "packet 160" is less than the sequence number of "packet 161," and thus "packet 160" is determined to be late and is dropped directly. In consequence, "packet 166" is then inserted into the buffer 20.

Again, referring to FIG. 1, the audio controlling module 30 includes a comfort noise generator 32, a decompressor 34, and a compressor 36. The audio controlling module 30 determines whether the buffered packet output from the buffer 20 (hereinafter referred to as "the output packet") is a pseudo packet or a VoIP packet. If the output packet is a pseudo packet, the output packet is directly transmitted to the comfort noise generator 32 of the audio controlling module 30 for generating comfort noise; otherwise, if the output packet relates to the VoIP packet, the output packet is directly transmitted to the decompressor 34 for decompressing the output packet to raw data (as described above).

The audio module 40 is configured for receiving and playing the comfort noise or the raw data via audio drivers (not shown in FIG. 1). In this way, even if the packets arrive out of order, the comfort noise is played to reassure a listener that the telephone conversation has not ended.

Figure 4:
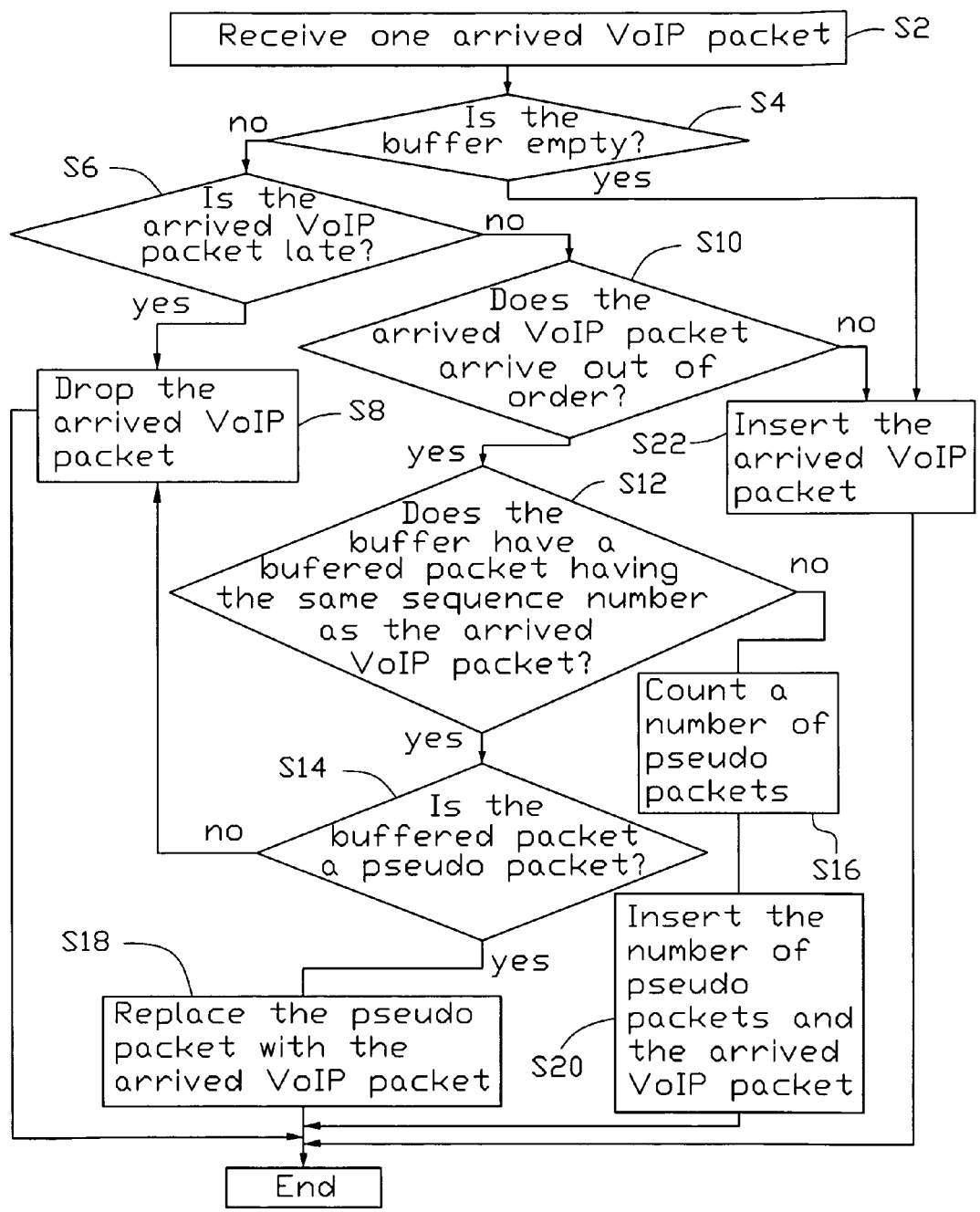
FIG. 4 is a flow chart illustrating a method for processing VoIP packets in accordance with an exemplary embodiment.

FIG. 4 is a flow chart illustrating a method for processing VoIP packets in accordance with the exemplary embodiment. In step S2, an arrived VoIP packet is output to the buffer 20.

In step S4, the buffer 20 determines whether the buffer 20 is empty. If the buffer 20 is empty, in step S22, the arrived VoIP packet is inserted into the buffer 20 directly. Otherwise, if the buffer 20 is not empty, in step S6, the buffer 20 determines if the arrived VoIP packet is late in accordance with the RTP information of the arrived VoIP packet and the dimension of the buffer 20. If the arrived VoIP packet is late, in step S8, the buffer 20 drops the arrived VoIP packet. Otherwise, if the arrived VoIP packet is not late, in step S10, the buffer 20 determines if the arrived VoIP packet has arrived out of order according to the sequence numbers of the arrived VoIP packet and the preceding VoIP packet.

If the arrived VoIP packet arrives in the proper order, in step S22, the arrived VoIP packet is directly inserted into the buffer 20. If the arrived VoIP packet arrives out of order, in step S12, the buffer 20 determines whether the buffer 20 has a buffered packet having the same sequence number as the arrived VoIP packet. If the buffer 20 has the buffered packet having the same sequence number as the arrived VoIP packet, in step S14, the buffer 20 determines whether the buffered packet is the pseudo packet. If the buffered packet is the pseudo packet, the buffer 20 replaces the pseudo packet with the arrived VoIP packet in step S18. If the buffered packet is not the pseudo packet, the buffer 20 drops the arrived VoIP packet in step S8.

In step S16, if the buffer 20 does not have a buffered packet having the same sequence number as the arrived VoIP packet, the buffer 20 counts the number of pseudo packets needed to be inserted by calculating the difference between the sequence numbers of the arrived VoIP packet and the preceding VoIP packet. Specifically, the number of the pseudo packets is equal to the difference of the sequence numbers minus one. In step S20, the buffer 20 generates the number of pseudo packets, and inserts the number of pseudo packets and the arrived VoIP packet into the buffer 20 in sequence.

Figure 5:
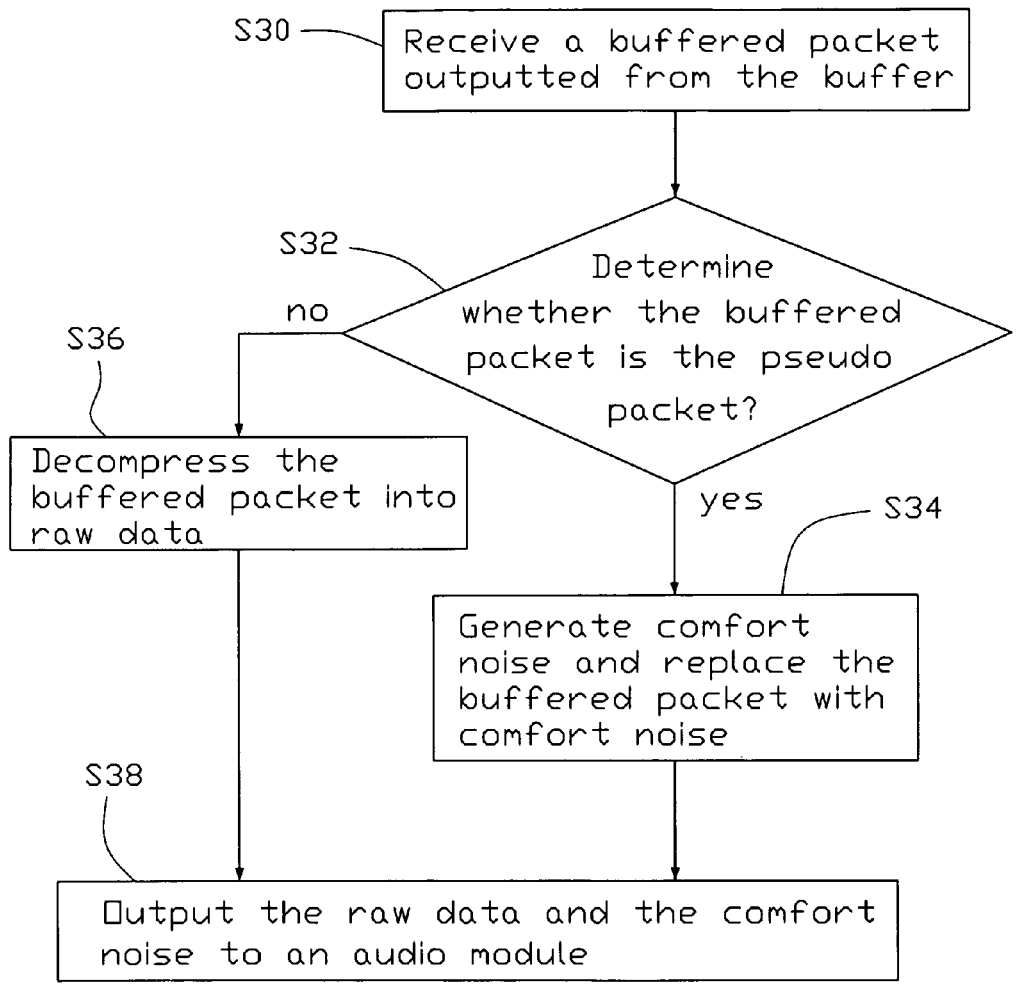
FIG. 5 is a flow chart illustrating the steps performed by an audio controlling module of the apparatus of FIG. 1.

FIG. 5 is a flow chart illustrating the steps performed by the audio controlling module 30 in accordance with the exemplary embodiment. Firstly, in step S30, the audio controlling module 30 receives a buffered packet output from the buffer 20. In step S32, the audio controlling module 30 determines whether the buffered packet is the pseudo packet. If the buffered packet is the pseudo packet, the audio controlling module 30, in step S34, controls the generation of the comfort noise by the comfort noise generator 32 and replaces the buffered packet with the generated comfort noise. Otherwise, if the buffered packet is not the pseudo packet, the buffered packet, i.e., the VoIP packet, is decompressed into raw data by the decompressor 34 in step S36. Lastly, in step S38, the audio controlling module 30 outputs the raw data and the comfort noise to the audio module 40 for playing.

It should be emphasized that the above-described embodiments, particularly, any exemplary embodiments, are merely possible examples of implementations, and set forth for a clear understanding of the principles of the invention. Many variations and modifications may be made to the above-described exemplary embodiment(s) without departing substantially from the spirit and principles of the invention. All such modifications and variations are intended to be included herein within the scope of this disclosure and the above-described exemplary embodiment(s), and the present invention is protected by the following claims.

What is claimed is:

1. A method for processing Voice over Internet Protocol (VoIP) packets in an electronic apparatus, the method comprising the steps of:
   (a) sending a VoIP packet to a buffer in the electronic apparatus;
   (b) determining if an arrived VoIP packet arrives out of order according to a sequence number of the arrived VoIP packet and a sequence number of a preceding VoIP packet;
   (c) determining whether the buffer has a packet having a same sequence number as the sequence number of the arrived VoIP packet, if the arrived VoIP packet arrives out of order;
   (d) calculating the difference between the sequence number of the arrived VoIP packet and the sequence number of the preceding VoIP packet if the buffer has no such packet having the same sequence number as the arrived VoIP packet;
   (e) counting a number of pseudo packets needed to be inserted into the buffer according to the calculated difference and generating the number of pseudo packets, the number of the pseudo packets being equal to the difference of the sequence numbers minus one;
   (f) inserting the number of pseudo packets and the arrived VoIP packet into the buffer;
   (g) outputting packets in the buffer to an audio controlling module, the output packets comprising the pseudo packets and the VoIP packets; and
   (h) generating comfort noise if the output packets are the pseudo packets, decompressing the output packets into raw data if the output packets are the VoIP packets, and outputting the comfort noise and the raw data to an audio module for playing.

2. The method as claimed in claim 1, further comprising: determining whether the buffer is empty after step (a); and inserting the arrived VoIP packet into the buffer if the buffer is empty.

3. The method as claimed in claim 1, wherein the arrived VoIP packet comprises real time protocol information, including timestamp and a sequence number.

4. The method as claimed in claim 3, further comprising: determining whether the arrived VoIP packet is late in accordance with a RTP information of the arrived VoIP packet and a dimension of the buffer after step (a).

5. The method as claimed in claim 4, further comprising: dropping the arrived VoIP packet if the arrived VoIP packet is late; or executing step (c) if the arrived VoIP packet is not late.

6. The method as claimed in claim 1, further comprising: inserting the arrived VoIP packet into the buffer if the arrived VoIP packet arrives in a proper order after step (b).

7. The method as claimed in claim 1, further comprising: determining whether the packet is a VoIP packet, if the buffer has the packet having the same sequence number as the sequence number of the arrived VoIP packet.

8. The method as claimed in claim 7, further comprising: dropping the arrived VoIP packet if the packet is a VoIP packet; or replacing the packet with the arrived VoIP packet if the packet is not a VoIP packet.

9. The method as claimed in claim 1, wherein the preceding VoIP packet is a VoIP packet previously inserted into the buffer before the arrived VoIP packet.

10. A system for processing Voice over Internet Protocol (VoIP) packets in an electronic apparatus, the system comprising a real time transport protocol (RTP) module, a buffer, and an audio controlling module, wherein:
   the RTP module is configured for receiving a plurality of arrived VoIP packets, and sending the arrived VoIP packets to the buffer one by one;
   the buffer is configured for reordering the arrived VoIP packets by generating pseudo packets while the arrived VoIP arrives out of order, wherein the reordering step comprises steps (b)-(e):
   (b) determining if an arrived VoIP packet arrives out of order according to a sequence number of the arrived VoIP packet and a sequence number of a preceding VoIP packet;
   (c) determining whether the buffer has a packet having a same sequence number as the sequence number of the arrived VoIP packet, if the arrived VoIP packet arrives out of order;
   (d) calculating the difference between the sequence number of the arrived VoIP packet and the sequence number of the preceding VoIP packet if the buffer has no such packet having the same sequence number as the arrived VoIP packet;

(e) counting a number of pseudo packets needed to be inserted into the buffer according to the calculated difference and generating the number of pseudo packets, the number of the pseudo packets being equal to the difference of the sequence numbers minus one;

the buffer is further configured for inserting the reordered VoIP packets and the generated pseudo packets into the buffer, and outputting packets in the buffer to the audio controlling module, the output packets comprising the pseudo packets and the VoIP packets; and the audio controlling module configured for generating comfort noise if the output packets are the pseudo packets, decompressing the output packets into raw data if the output packets are the VoIP packets, and outputting the comfort noise and the raw data to an audio module for playing.

11. The apparatus as claimed in claim 10, wherein the buffer is further configured for:

determining whether the packet is a VoIP packet, if the buffer has the packet having the same sequence number as the sequence number of the arrived VoIP packet;

dropping the arrived VoIP packet if the packet is a VoIP packet; and replacing the packet with the arrived VoIP packet if the packet is not a VoIP packet.

12. The apparatus as claimed in claim 10, wherein the buffer is further configured for determining whether the arrived VoIP packet is late in accordance with a RTP information of the arrived VoIP packet and a dimension of the buffer, dropping the arrived VoIP packet if the arrived VoIP packet is late.

13. The apparatus as claimed in claim 10, wherein the buffer is further configured for inserting the arrived VoIP packet into the buffer if the arrived VoIP packet arrives in a proper order.

* * * * *